US012353793B2

(12) United States Patent
Vaidya et al.

(10) Patent No.: US 12,353,793 B2
(45) Date of Patent: *Jul. 8, 2025

(54) DYNAMICALLY PREVENTING AUDIO ARTIFACTS

(71) Applicant: NVIDIA Corporation, Santa Clara, CA (US)

(72) Inventors: Utkarsh Vaidya, Santa Clara, CA (US); Sumit Bhattacharya, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/676,243

(22) Filed: May 28, 2024

(65) Prior Publication Data

US 2024/0311080 A1    Sep. 19, 2024

Related U.S. Application Data

(63) Continuation of application No. 18/161,326, filed on Jan. 30, 2023, now Pat. No. 11,995,378, which is a
(Continued)

(51) Int. Cl.
*G06F 3/16* (2006.01)
*G06N 3/045* (2023.01)
*G06N 7/01* (2023.01)

(52) U.S. Cl.
CPC .............. *G06F 3/165* (2013.01); *G06F 3/162* (2013.01); *G06N 3/045* (2023.01); *G06N 7/01* (2023.01)

(58) Field of Classification Search
CPC ....... G06F 3/165; G06F 3/162; G06N 3/0454; G06N 7/005
See application file for complete search history.

(56) References Cited

U.S. PATENT DOCUMENTS 6,594,213 B1    7/2003  Hayashi
6,901,039 B1    5/2005  Sugie et al.
(Continued)

FOREIGN PATENT DOCUMENTS

GB       2331678 A     5/1999
JP    2002268662 A     9/2002
(Continued)

OTHER PUBLICATIONS

Ivo Creusen, et al.; "Control of jitter buffer size using machine learning"; Technical Disclosure Commons, Defensive Publications Series; http://www.tdommons.org/dpubs_series; Dec. 6, 2017; 7 pgs.
(Continued)

*Primary Examiner* — Joseph Saunders, Jr.

(57) ABSTRACT

The disclosure is directed to a process that can predict and prevent an audio artifact from occurring. The process can monitor the systems, processes, and execution threads on a larger system/device, such as a mobile or in-vehicle device. Using a learning algorithm, such as deep neural network (DNN), the information collected can generate a prediction of whether an audio artifact is likely to occur. The process can use a second learning algorithm, which also can be a DNN, to generate recommended system adjustments that can attempt to prevent the audio glitch from occurring. The recommendations can be for various systems and components on the device, such as changing the processing system frequency, the memory frequency, and the audio buffer size. After the audio artifact has been prevented, the system adjustments can be reversed fully or in steps to return the system to its state prior to the system adjustments.

20 Claims, 8 Drawing Sheets

Related U.S. Application Data continuation of application No. 17/121,373, filed on Dec. 14, 2020, now Pat. No. 11,567,728, which is a continuation of application No. 16/285,941, filed on Feb. 26, 2019, now Pat. No. 10,896,021.

(56) References Cited

U.S. PATENT DOCUMENTS

| | | |
|---|---|---|
| 7,236,436 B2 | 6/2007 | Hayashi |
| 7,737,960 B2 | 6/2010 | Gong et al. |
| 8,209,731 B2 | 6/2012 | Lee et al. |
| 8,331,385 B2 | 12/2012 | Black et al. |
| 8,527,075 B2 | 9/2013 | Julian et al. |
| 9,070,198 B2 | 6/2015 | Carter et al. |
| 9,985,887 B2 | 5/2018 | Roncero Izquierdo et al. |
| 10,236,031 B1 | 3/2019 | Gurijala |
| 2003/0031336 A1 | 2/2003 | Harrison et al. |
| 2003/0156639 A1 | 8/2003 | Liang |
| 2007/0183192 A1 | 8/2007 | Barnum et al. |
| 2007/0203597 A1 | 8/2007 | Iyoshi |
| 2011/0043694 A1 | 2/2011 | Izuno et al. |
| 2012/0009892 A1 | 1/2012 | Yen et al. |
| 2017/0063692 A1 | 3/2017 | Izquierdo et al. |
| 2019/0373490 A1* | 12/2019 | Rahmati ............. H04L 43/0829 |
| 2020/0272409 A1 | 8/2020 | Vaidya et al. |

FOREIGN PATENT DOCUMENTS

| | | |
|---|---|---|
| JP | 2007194845 A | 8/2007 |
| KR | 20090050768 A | 5/2009 |

OTHER PUBLICATIONS

"Audio Class Stream Data Flow"; Micrium Documentation; μC/USB Device Documentation V4.05; https://doc.micrium.com/display/USBDDOCV405/Audio+Class+Stream+Data+Flow; 2019; 8 pgs.

"Decrease Underrun"; Matlab & Simulink—MathWorks India; The MathWords, Inc.; https://in.mathworks.com/help/audio/ug;decrease-underrun.html; 2016; 6 pgs.

* cited by examiner

DYNAMICALLY PREVENTING AUDIO ARTIFACTS

CROSS-REFERENCE TO RELATED APPLICATION

This application is a continuation application of U.S. patent application Ser. No. 18/161,326, filed by Vaidya, et al., on Jan. 30, 2023, entitled "DYNAMICALLY PREVENTING AUDIO ARTIFACTS," which is a continuation application of U.S. patent application Ser. No. 17/121,373, filed by Vaidya, et al., on Dec. 14, 2020, entitled "DYNAMICALLY PREVENTING AUDIO ARTIFACTS," which is a continuation application of U.S. patent application Ser. No. 16/285,941, filed by Vaidya, et al. on Feb. 26, 2019, entitled "DYNAMICALLY PREVENTING AUDIO UNDERRUN USING MACHINE LEARNING," wherein each of the above applications are commonly assigned with the present application and are incorporated herein by reference in their entirety.

TECHNICAL FIELD

This application is directed, in general, to an audio processing system and, more specifically, to an audio processing system that can reduce or prevent audio underrun conditions.

BACKGROUND

In audio processing systems that share processing structures with other systems or applications, the audio processing system may experience delays in producing audio requests, such as executing an audio processing thread. Such delays can be caused by other systems and applications that are running on the same hardware, the priority of the various executing threads on the system, and the state of interrupt requests (IRQ) on the system—for example, an IRQ waiting on an external flag or indicator.

The potential system delays can cause audio glitches, such as pops, crackles, and gaps, which can lessen the user's listening experience. One type of glitch can be an audio underrun condition. This can occur when the existing audio portion in an audio buffer is fully output prior to the subsequent audio portion being provided by the audio system's executing threads. A method to detect the possibility of such audio underrun conditions and to recommend how to best compensate for those conditions would be beneficial to improve a user's listening experience.

SUMMARY

In one aspect, a method of processing computer generated audio is disclosed. In one example, the method includes: (1) determining, using a neural network, a probability of an audio artifact during output of an audio signal generated using a computing system, wherein the determining the probability of the audio artifact is based at least on a processing frequency of the system, and (2) adjusting at least one of the processing frequency of the system or a memory frequency of the system to lower the probability of an audio artifact occurring when the probability is above a threshold.

In another aspect, another method of processing computer generated audio is disclosed. In one example this method includes: (1) determining, using a neural network, a probability of an audio artifact during output of an audio signal generated using a computing system, wherein the determining the probability of the audio artifact is based at least on a memory frequency of the system, and (2) adjusting at least one of the memory frequency of the system or a processing frequency of the system to lower the probability of an audio artifact occurring when the probability is above a threshold.

In another aspect, a computing system is disclosed. In one example the computing system comprises one or more processing units to perform operations that include: (1) determining, using a neural network, a probability of an audio artifact during output of a computer generated audio signal, wherein the determining the probability of the audio artifact is based on a processing frequency or a memory frequency of the computing system, and (2) adjusting at least one of the processing frequency or the memory frequency when the probability is higher than a threshold.

BRIEF DESCRIPTION

Reference is now made to the following descriptions taken in conjunction with the accompanying drawings, in which.

DETAILED DESCRIPTION

From a user experience perspective, an important aspect of an audio system is its quality. Quality is the ability to render an audio portion without encountering an audio artifact, such as an underrun, pop, buzz, noise, glitch, or other type of audio artifact. An audio portion is any part or whole of an audio signal. Examples of an audio signal include a song, music, a sound effect generated by an application or hardware, words, phrases, or sound bites generated, retrieved, or transformed by an application, and a spoken phrase such as from an audio book or speech-to-text processing. The audio signal can be generated or received by an electronic device which includes an audio processing system. For example, a song may be streamed to, i.e., received by, a digital radio and the digital radio can process the audio portion and output it to speakers. Another example is a mobile device that generates various audio portions while executing one or more applications, e.g., mobile gaming with game play sound effects.

Another important aspect of an audio system is audio latency. Audio latency is the delay between an application generating or receiving an audio portion, and the generation of a corresponding sound by an audio output device. Latency can become an issue when there is more than one process running on the processing system. For example, a mobile device can be executing an application while also generating audio portions. Audio latency can by impacted by how the mobile device handles balancing the execution of the application and the processing of the audio portion. Another example can be a processing system on a vehicle. The processing system, of which the audio processing system can be a part, may be handling several tasks, such as updating a global positioning system, monitoring the air conditioning temperature, listening for voice commands, as well as processing the audio portion. These other demands on the system can impact the audio latency experienced by the user. The processing system can be implemented as a type of processing unit, for example, a central processing unit (CPU), a graphics processing unit (GPU), an audio processing unit, or other types of processing units.

Audio latency depends on processing latency (such as the compute cycles of the processing system handling the audio portion), scheduling latency (such as managing execution threads on a processing system handling application requests, in addition to processing the audio portion), and buffering latency (such as the size of the buffer holding the audio portion and the length of time to output the buffer contents). For system on a chip (SoC) platforms, buffering latency tends to be the dominant factor of overall audio latency. Buffering can assist in handling synchronization between the audio application execution thread, the audio mixer execution thread, and the audio direct memory access (DMA) execution thread.

The audio buffer size can be calculated utilizing a worst-case scenario for anticipated system jitter. When an execution delay of an audio process becomes greater than the duration of the audio portion stored in the audio buffer, an underrun can result, i.e., the audio buffer completes output of existing content prior to new content being added. In execution thread terms, an audio underrun condition can occur when an audio producer thread cannot provide an audio portion to an audio consumer thread/DMA in time. This can result in a user hearing an audio glitch, pop, or noise, and can cause a negative user experience. This is similar to when a video frame is dropped or when a graphics defect occurs.

Reducing the audio buffer size can improve the audio latency of the audio processing system. Reducing the audio buffer size, however, can also increase the probability of an audio underrun condition. As such, improving audio latency and improving audio quality can be counter to each other.

To prevent an audio underrun condition, the processing system can utilize a worst-case scenario buffer size. This can prevent an audio underrun condition, while negatively impacting the audio latency factor. The worst-case scenario may occur only at some points in time, leaving the remaining points in time in a less than optimized audio processing state. A smaller audio buffer size can be more efficient during these remaining points in time.

Another approach to prevent audio underrun conditions can be to increase the processing system or the memory operating frequencies to reduce audio latency while keeping the audio buffer size smaller than needed for the worst-case scenario. This approach, however, can increase the overall system's power consumption, thereby reducing mobile systems' operational time between charges.

Another approach to prevent audio underrun conditions can be to increase or boost processing system frequencies and memory frequencies that are specially tuned to certain applications and applied only when those applications are running. Applications that are not designed for the specially built boosting efficiencies, however, cannot take advantage of them. In addition, managing the various system parameters under different usage scenarios may need manual experimentation to determine an appropriate parameter configuration for each usage scenario.

For an improved audio system, this disclosure describes a process that can predict a probability of an audio underrun condition based on the state of a system, i.e., a probability predictor, and describes a process to generate audio correction parameters to attempt to preempt a potential audio underrun condition, i.e., an audio correction system.

An audio underrun condition typically occurs when the processing threads of the audio process are delayed for a greater length of time than the length of time of the audio portion in the audio buffer. The first set of parameters that are used as input to the probability predictor relate to the scheduling of execution threads. Thread scheduling can be affected by several factors, for example: (1) A thread with a higher priority than the audio processing threads is executed first; (2) A kernel thread can disable an interrupt request (IRQ), thereby delaying execution of the audio system threads; (3) The processing system can be in a low power state which requires a certain time interval to power up to a normal state for processing the audio system threads; (4) A long running IRQ process for non-audio system threads can result in a delay in executing the audio system threads; or (5) The processing system or memory can be operating at a lower than normal frequency, i.e., power level, thereby causing the audio system threads to take longer to complete. The various factors can result in the audio system threads being preempted by another execution thread, or penalized by reducing the audio system thread's execution priority. This can occur, for example, when utilizing a fair scheduler process such as the Linux Completely Fair Scheduler.

The probability predictor can utilize environment parameters as an input. The environment parameters can be the (1) behavior of threads running on the processing system when audio portions are being processed, (2) identifying user and kernel threads, and their active durations, that are actively executing concurrently with the audio system threads, (3) processing system frequency (The processing system frequency can be applied to a part or all of the processing system where the processing system can include a CPU, a GPU, an audio system processor unit, other processing units, a bus or other communication channels, communication ports, and other aspects of the audio system), (4) memory frequency, (5) and other hardware and non-hardware parameters that can affect the execution of a processing thread. Examples of the parameters include an operating temperature of the system, other applications and processes running on the processing system, and a priority thread waiting on an external return or action.

In non-limiting examples, the environment parameters can be collected from one or more of the processing system, the audio system, and the audio correction system, as well as from a device or product, i.e., an electronic device, that includes the above-mentioned systems. The electronic device can be various types of user devices, such as a tablet, smartphone, laptop, vehicle systems, gaming systems, and other computing systems. The audio system and processing system can be separate from the electronic device. In another aspect, the audio system and processing system can be logical portions of, or software running on, the electronic device. Other combinations are possible as well. For example, a CPU of a tablet can execute the functions described herein of the audio system and the processing system.

The environment parameters relating to thread execution can be normalized for execution time of each executing thread over a specified time period, i.e., an audio check interval. The audio check interval can be derived from the electronic device, the hardware capability, the software running on the electronic device, and the other environment parameters. Each electronic device can have a different audio check interval.

In non-limiting examples, a learning system can be utilized to implement the probability predictor and to synthesize the environment parameters to generate a resultant probability. One such learning system can be a deep neural network (DNN). DNNs can have the ability to learn new features and accept additional environment parameters as new information is learned. Other learning systems can be utilized as well. A first DNN can be used to implement the probability predictor and a second DNN can be used to implement the audio correction parameter system. If the first DNN indicates that an audio underrun condition is likely, then the second DNN can be executed to generate the potential audio correction parameters, i.e., recommendations to reduce the probability of an audio glitch or artifact. The first DNN—dependent on the system load and the time interval required to generate an audio portion—can provide a prediction or probability indication with sufficient time for the second DNN to be able to prevent or reduce the audio glitch, such as an audio underrun condition. For example, sufficient time is such that an additional audio portion can be generated for an increased buffer size prior to the audio underrun condition occurring.

Once the input environment parameters are determined, training the first DNN can be completed. This can be accomplished using one or more devices or products and running one or more applications with some multi-media content. Another application can run on each electronic device to generate random events to emulate various types of use cases. An enhanced environment parameter snapshot can be taken at each audio check interval, e.g., when an audio portion is expected to be output. The enhanced environment parameters can include additional information than was used for the input parameters. The additional information can be, for example, whether or not an audio underrun condition occurred and an actual execution time for each processing system thread. The enhanced environment parameters can be used as the training data set.

Training the first DNN can utilize a variety of conventional tuning parameters and algorithms. For this example, the first DNN can utilize a neural network with two hidden layers. Other aspects can utilize one or more layers. The number of nodes (n) used in the input layer can be determined utilizing the size of the training data set. The first hidden layer can use approximately ¾ n nodes and the second hidden layer can use 2n+1 nodes. Various functions can be used for the activation and cost functions, such as Leaky ReLu and Cross-Entropy. The training algorithm can compute weight and biases of the input parameters such that the cost function can be optimized. A Stochastic Gradient Descent algorithm can be used to minimize an error between the cost function output and an actual output. In order to minimize cost, a direction can be determined by taking a gradient of the cost function output. A back-propagation algorithm can be used to compute the gradient of the cost function output. Other algorithms can be selected to perform these specific operations.

The probability predictor, such as the trained first DNN, can be deployed on the electronic device as a background service. The probability predictor can execute at an audio check interval using the state of the processing system and audio system as represented by the then current environment parameters. The output of the probability predictor is an indicator of whether an audio underrun condition can potentially occur, and therefore indicate a need to generate audio correction parameters.

The audio correction parameters can be generated utilizing various learning algorithms. The second DNN is one such algorithm that can be used. The second DNN can use as input the enhanced environment parameters, i.e., the processing unit frequency, memory frequency, buffer size, current executing threads, IRQs that are active or disabled, the types of threads being executed and their relative priorities, and other parameters that can provide information on the system state. The output of the second DNN, i.e., the output represented by the audio correction parameters, can be a revised processing unit frequency, a revised memory frequency, and a revised buffer size. Other audio correction parameters that can be utilized include, for example and without limitation, increasing the priority of the audio processing threads. By increasing the processing unit frequency or memory frequency, the currently executing threads can complete their actions at a reduced time interval, thereby allowing the audio system threads to complete in a reduced time interval as well.

The preference can be set that the processing unit frequency and memory frequency are increased prior to increasing the buffer size. This preference can assist in unnecessarily increasing the audio latency issues. The processing system can have a maximum value to which the processing unit frequency can be increased and a separate maximum value to which the memory frequency can be increased. The second DNN can increase the processing unit and memory respective frequencies, if not already at the maximum value, up to a value equal to the maximum value for each system. If the second DNN determines that an audio underrun condition may continue to be probable, then the second DNN can also adjust the buffer size.

Training the second DNN can be conducted using various algorithms. For example, to collect training data for the second DNN, the first DNN can be deployed on the electronic device. Similar to training the first DNN, the audio product can be used by one or more processes and applications, as well as running a pseudo random event generator. Data can be collected when the first DNN detects a probability of an audio underrun condition. When the first DNN indicates the audio underrun condition, the second DNN can pseudo-randomly boost the processing unit frequency and the memory frequency. The second DNN can then observe if an audio underrun condition actually occurred over the subsequent training time interval (X seconds). If there is no detected audio underrun condition over X seconds, all active threads' execution time details over those X seconds, along with the processing unit frequency and memory frequency can be collected and stored as a training data set.

If an audio underrun condition remains after the processing unit or memory frequency boost, then one or more additional frequency boosts for the processing unit or memory can be issued. This can continue until the maximum frequency is reached for both the processing unit and memory systems. In a training situation where maximizing the processing unit frequency and the memory frequency does not resolve the audio underrun condition, then the duration of the resulting audio underrun condition can be measured. This duration can be utilized to compute an increase in the audio buffer size and such information can be stored as part of the training data set.

The second DNN can use various training algorithms, such as a convolutional neural network after the input layer and a Softmax layer at the end. Leaky ReLu can be used as the activation function and the Cross-Entropy function can be used as the cost or loss function. Other activation functions and cost or loss function algorithms can be used as well.

Once the processing unit frequency, memory frequency, or buffer size have been increased, a following reduction of the respective increases can occur in one or more steps. The step value used can be determined by the second DNN during training. After each step value reduction is applied, the second DNN can re-evaluate whether further reductions of the increases can be applied, the current levels can be maintained, or if further increases in the audio correction parameters are warranted. The step value can be defaulted to a number, such as five steps, meaning that the reduction will occur at a rate of 20.0% of the original increase amount per step. The second DNN can determine a different step value as additional training takes place. By reducing the frequency boosts and reducing the increase in buffer size back to the baseline or original levels, the overall power consumption for the system can be minimized compared to an alternate solution of maintaining a higher frequency value for the processing unit and memory systems.

Figure 1:
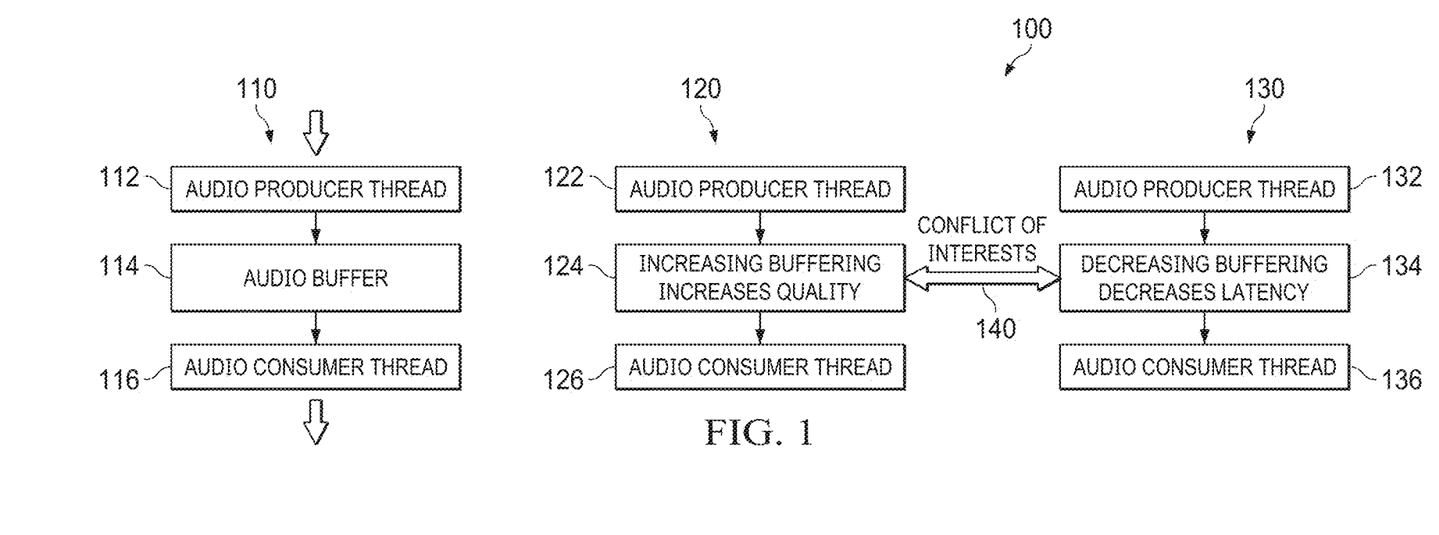
FIG. 1 is an illustration of a diagram of an example audio playback pipeline.

Turning now to the Figures, FIG. 1 is an illustration of a diagram of an example audio playback pipeline 100. Audio playback pipeline 100 is shown with three variants moving from a producer execution thread to a consumer execution thread. A typical audio pipeline is demonstrated by audio playback pipeline 110. A request to produce an audio portion is received by an audio producer thread 112. The request to produce an audio portion can be a request to generate an audio portion, for example, from within an application, or to receive an audio portion, for example, from a streaming service. Audio producer thread 112 can be one or more execution threads, or one or more system processes. Audio producer thread 112 processes the request and sends the audio portion to audio buffer 114.

Audio buffer 114 can be a conventional audio buffer. Audio consumer thread 116 can retrieve the audio portion from the audio buffer 114. Audio consumer thread 116 can be one or more execution threads, or one or more system processes. The output of audio consumer thread 116 is typically directed to one or more speakers, headphones, earpieces, amplifiers, and other auditory devices. The output can also be directed to other processes as well.

Audio playback pipeline 120 follows a similar path from audio producer thread 122 to audio buffer 124, and then to audio consumer thread 126. Audio buffer 124 has been modified to increase the size of the audio buffer as compared to audio buffer 114. This can improve audio quality by removing audio underrun conditions.

Figure 2:
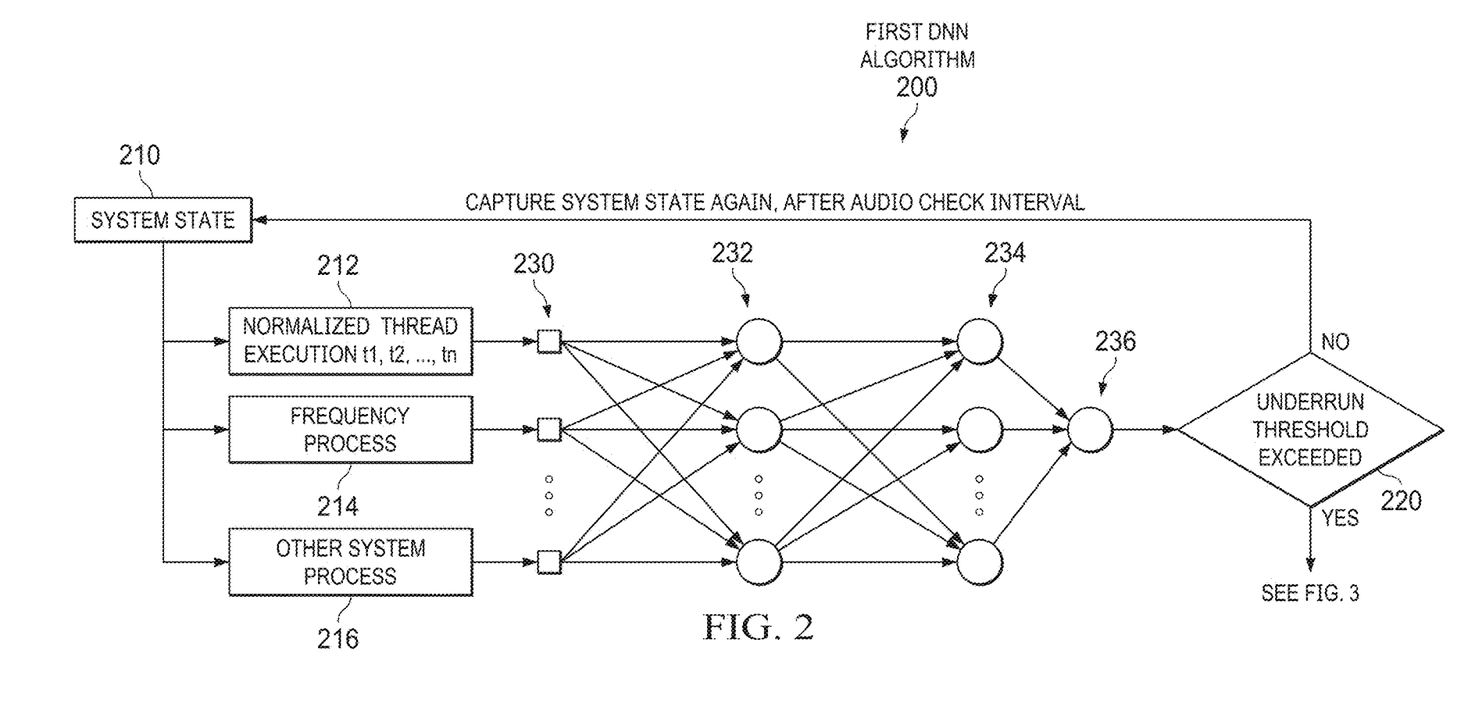
FIG. 2 is an illustration of a diagram of an example deep neural network (DNN) algorithm to predict the probability of an audio underrun condition.
Figure 3:
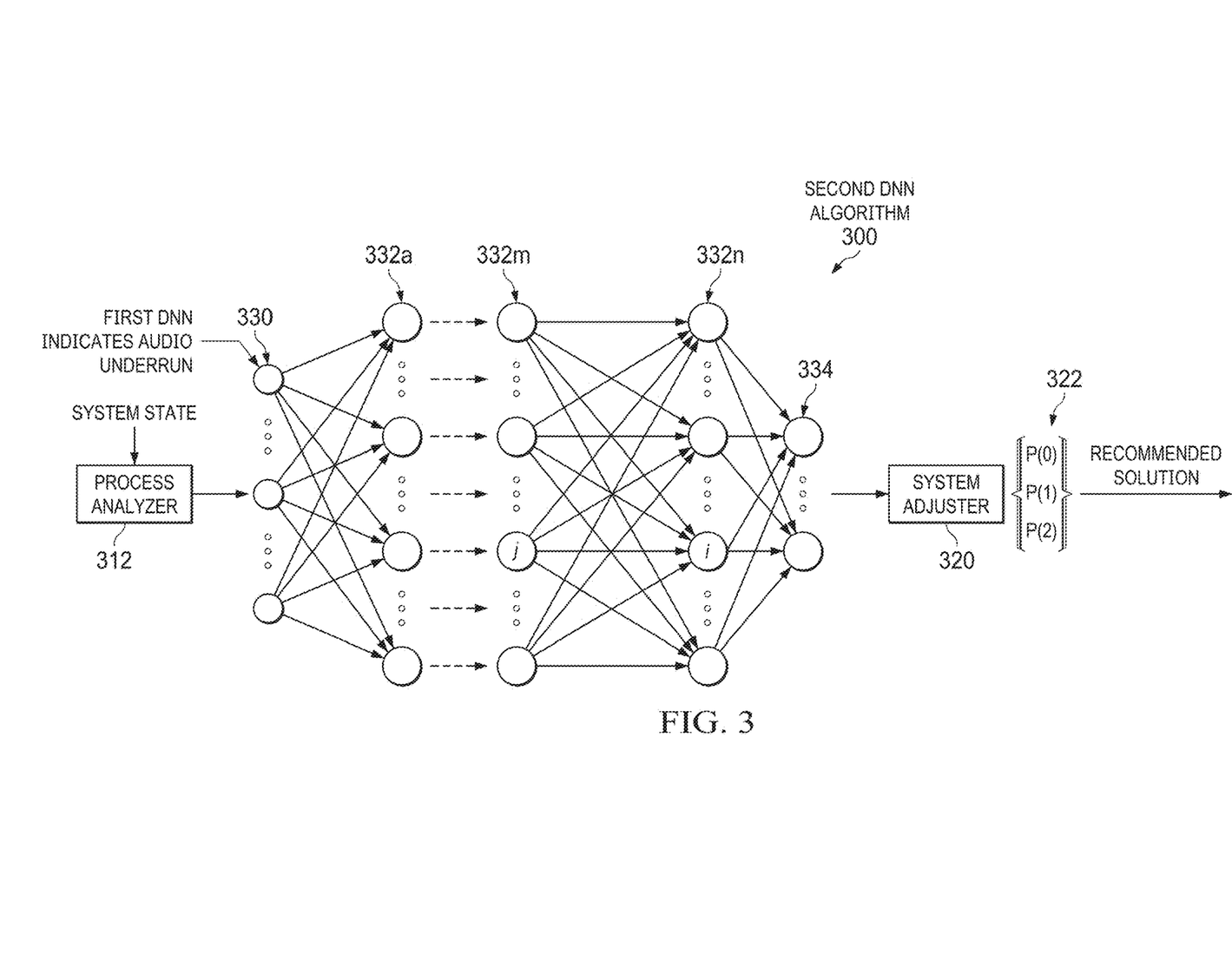
FIG. 3 is an illustration of a diagram of an example DNN algorithm to generate audio correction parameters.

Audio playback pipeline 130 follows a similar path as well. Audio playback pipeline 130 processes from audio producer thread 132 to audio buffer 134, and then to audio consumer thread 136. Audio buffer 134 has been modified to decrease the size of the audio buffer as compared to audio buffer 114. This can improve audio latency by reducing the time lag between when an audio portion is produced by audio producer 132 and when it is heard after audio consumer thread 136 receives the audio portion. This can affect the user experience if an audio portion is heard later than expected by a user or heard while not in synchronization with another indicator, such as a visual component. The benefits of increasing the audio buffer, as shown in audio buffer 124, and the benefits of decreasing the audio buffer, as shown in audio buffer 134, are in conflict. A balance is needed between these concerns. FIG. 2 and FIG. 3 demonstrate one technique for providing a balance between these audio system concerns.

FIG. 2 is an illustration of a diagram of an example DNN algorithm 200 to predict the probability of an audio underrun condition. DNN algorithm 200 represents an example of the first DNN process as described above. A state of the audio system and a state of the processing system, for example, a thread snapshot, is collected by system state 210, i.e., the environment parameters. The DNN algorithm 200 can then normalize the thread execution times, such as t1 through tn threads in normalized thread execution process 212.

The frequency process 214 can monitor the current and the future processing unit frequency and memory frequency. The frequency process 214 can also identify the maximum frequencies of the processing unit and memory. Other system information can be gathered through other system process 216. There can be additional factors used in predicting an audio underrun condition, such as ambient temperature and the number and types of other processes executing on the system, and other system informational factors.

The information from normalized thread execution process 212, frequency process 214, and other system process 216 can be input into the first DNN through input layer 230. There can be one or more hidden processing layers as shown with hidden layer 232 and hidden layer 234. More than two hidden layers can also be used. The output from the second hidden layer 234 is provided to an output layer 236. The output from output layer 236 can be analyzed by the first DNN process to determine if an audio underrun condition is likely to occur. The output from output layer 236 can be a probability percentage representing the chance that an audio underrun condition will occur, or can be a Boolean indicator indicating whether an audio underrun condition will occur.

If generated, then the probability can be transformed into the Boolean indicator using an audio underrun threshold. The audio underrun threshold is a threshold corresponding to the probability or likelihood of an audio underrun occurring. The audio underrun threshold used for this determination can vary based on user preferences, the electronic device's capabilities, the type of application that is executing that is related to the audio portion, learned parameters from past training, and other factors. If the audio underrun threshold 220 is exceeded, then the process can continue to the audio correction parameter processing, as demonstrated in the second DNN (see FIG. 3). If the threshold is not exceeded, then the process can return to the system state process 210 after waiting for a certain time period, for example, an audio check interval or the interval described above as N.

FIG. 3 is an illustration of a diagram of an example DNN algorithm 300 to generate audio correction parameters. DNN algorithm 300 represents an example of the second DNN process as described above. The system state information, i.e., the environment parameters, can be received by the process analyzer 312. Process analyzer 312 can utilize the environment parameters, normalize thread execution times, and receive other system information to be used in the second DNN processing.

The first DNN indicator can be received as input into input layer 330. The process analyzer 312 can send information and parameters to input layer 330. Second DNN algorithm 300 can have one or more hidden layers, as demonstrated by hidden layers 332a, through 332m and 332n. Second DNN algorithm 300 can have an output layer 334. Output layer 334 can output recommended system adjustments to a system adjustor 320. The adjustments can be a change in processing unit frequency, a change in memory frequency, a change in audio buffer size, and other audio system and processing system adjustments. There can be a probability, represented by probabilities 322, that each recommended adjustment may prevent the audio underrun condition. The system adjustor 320 can utilize the probabilities 322 to determine a recommended solution and request the system changes.

FIGS. 2 and 3 demonstrate one example implementation of the first DNN and second DNN algorithms. Other types of implementations, such as a varying number of hidden layers and nodes, can be utilized with this disclosure. In addition, other combinations of algorithms can be utilized, such as a different neural network, a different activation function, and a different cost or loss function. Other implementations corresponding to the logical processes described in both of FIGS. 2 and 3 can also be employed according to the principles of the disclosure. Varying the combinations of algorithms, such as the neural network, activation function, and cost/loss function, can be used to better tune the results for a particular hardware and software implementation combination.

Figure 4:
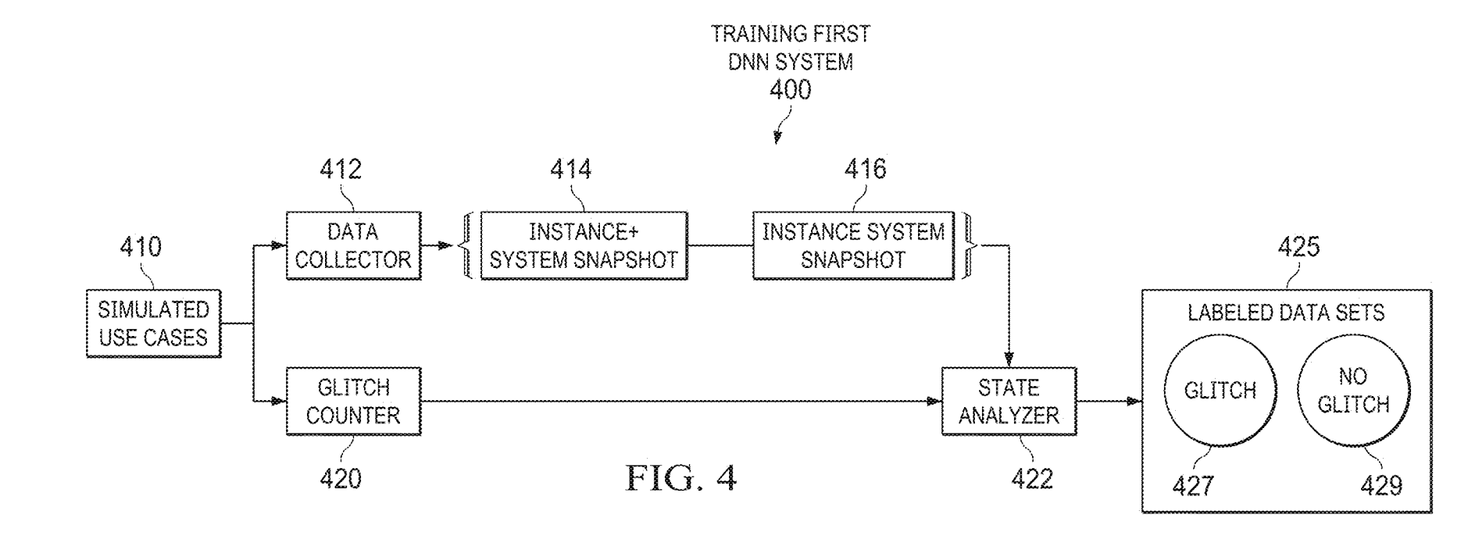
FIG. 4 is an illustration of a diagram of an example DNN training system.

FIG. 4 is an illustration of a diagram of an example DNN training system 400. DNN training system 400 can be used to create labeled datasets for a neural network for use in active monitoring and processing. The simulated use cases 410 can automate different audio system process use cases, such that over a period of time, the audio system processing thread activity can be monitored, in combination with the system and user space threads across the available processing unit cores, i.e., processing system.

Data collector 412 can collect system snapshot parameters. For example, data collector 412 can collect the total accumulated time of each executing thread on the processing unit, and then extract a normalized execution time of each of those threads over the last N seconds. The time difference between two consecutive system snapshots can be compared and normalized. In addition, other environment parameters can be collected.

The system snapshot difference can be computed, for example, by using Instance+system snapshot 414 and instance system snapshot 416. Instance+system snapshot 414 is a system snapshot taken at the $N^{th}+1$ instance, i.e., a second audio check interval. Instance system snapshot 416 is a system snapshot taken at an $N^{th}$, instance, i.e., a first audio check interval. The N represents a relative position of the system snapshot data collected. The active thread structures, from the previous $N^{th}$ instance to the current $N^{th}$ instance are taken together as the $N^{th}$ instance snapshot. There can be one or more system snapshots taken, each at the next $N^{th}$ audio check interval. The respective data collected within the instance system snapshot 416 can be subtracted from the respective data collected within the Instance+system snapshot 414.

Glitch counter 420 can track the count of audio portion glitches that occur during each time interval N. A glitch can be an audio underrun condition, or other audio artifacts. The glitch counter 420 can be used to determine labels for various sub-datasets, i.e., feature vectors of the neural network. The system snapshot results and the glitch counter 420 results can be sent to a state analyzer 422 to update the labeled datasets 425, i.e., the training data sets. They can be labeled as glitch feature vector 427 or a no glitch feature vector 429.

Figure 5:
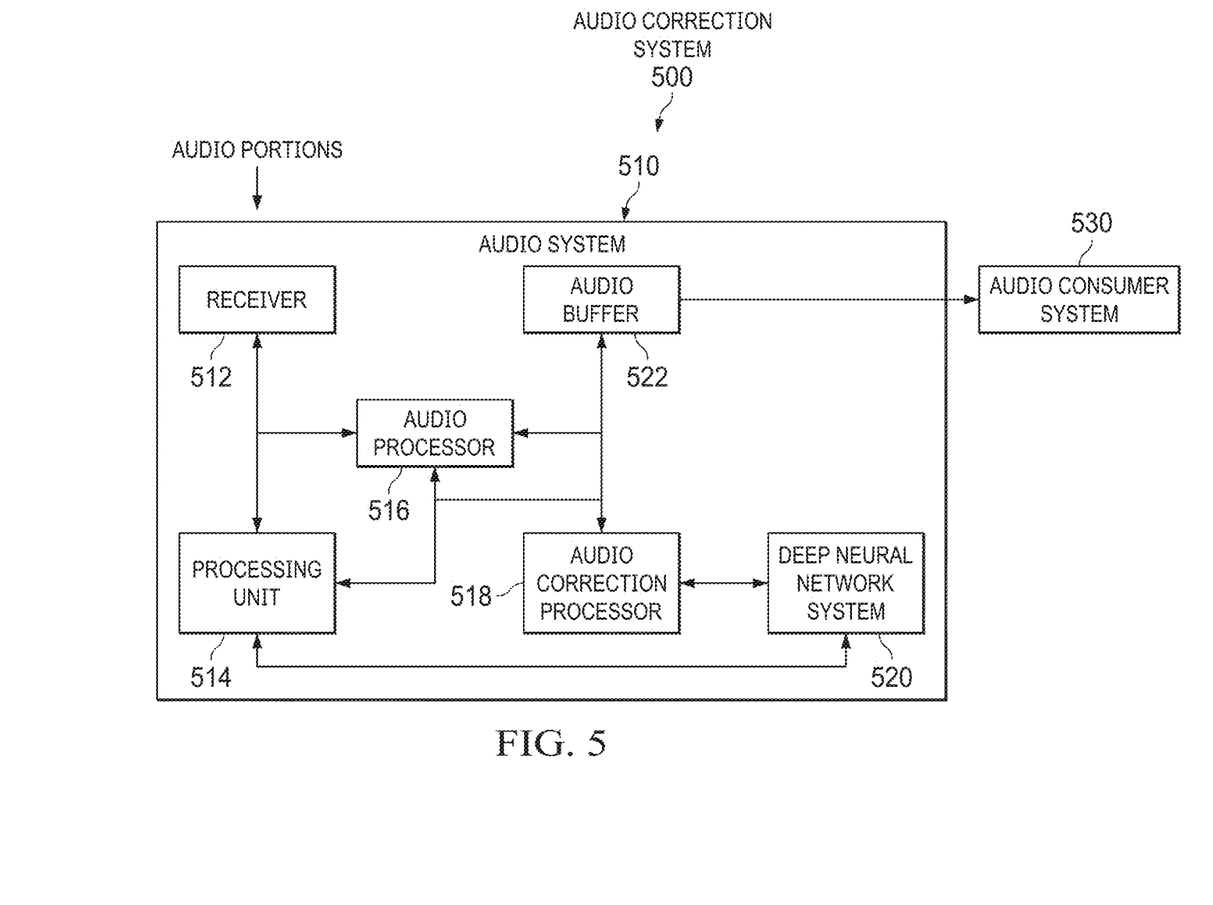
FIG. 5 is an illustration of a block diagram of an example audio correction system.

FIG. 5 is an illustration of a block diagram of an example audio correction system 500. Audio correction system 500 includes an audio system 510 and an audio consumer system 530. The audio system 510 and the audio consumer system 530 can be part of an electronic device, be separate components, or a combination thereof. For example, the audio system 510 can be part of an electronic device, which itself can be part of a larger system. Examples of larger systems include a tablet, a smartphone, a laptop, or an in-vehicle computing system. As an additional example, the audio consumer system 530 can be speakers included with the electronic device, or it can be separate speakers or headphones.

Audio system 510 can include a receiver 512, a processing unit 514, an audio processor 516, an audio correction processor 518, a DNN system 520, and an audio buffer 522. Receiver 512 is configured to receive an audio portion. The audio portion can be received from an application running on the computing device, running on another device, or received from another source, such as a streaming service, a wireless source, or a network connection. The receiver 512 sends the audio portion to an audio processor 516 that is configured to process, dynamically adjust, or otherwise modify the audio portion. The audio processor 516 can correct for ambient factors, such as, increasing volume as a vehicle's speed increases.

The processing unit 514 can be a conventional processing unit, for example, a CPU, GPU, or other type of processing system. Audio correction processor 518 can perform the analysis as described herein, such as the first DNN and the second DNN. The DNN system 520 can include the DNN datasets and heuristic algorithms. The audio portion output of the audio processor 516 or audio correction processor 518 can be placed in the audio buffer 522. The audio consumer system 530 can take the audio portion from the audio buffer 522 for output to a speaker, headphone, or other auditory producing system.

Audio system 510 represents a logical division of the algorithms and processes described herein. The various processors can be combined or separated in various implementations. For example, the audio processor 516 and audio correction processor 518 can be executed within processing unit 514. Processing unit 514 can be one or more processors, in various combinations of CPUs and GPUs. The DNN system 520 can be part of the audio system 510 or be a separate component that is communicatively coupled, such as through a network, wireless, or other connection type.

Figure 6:
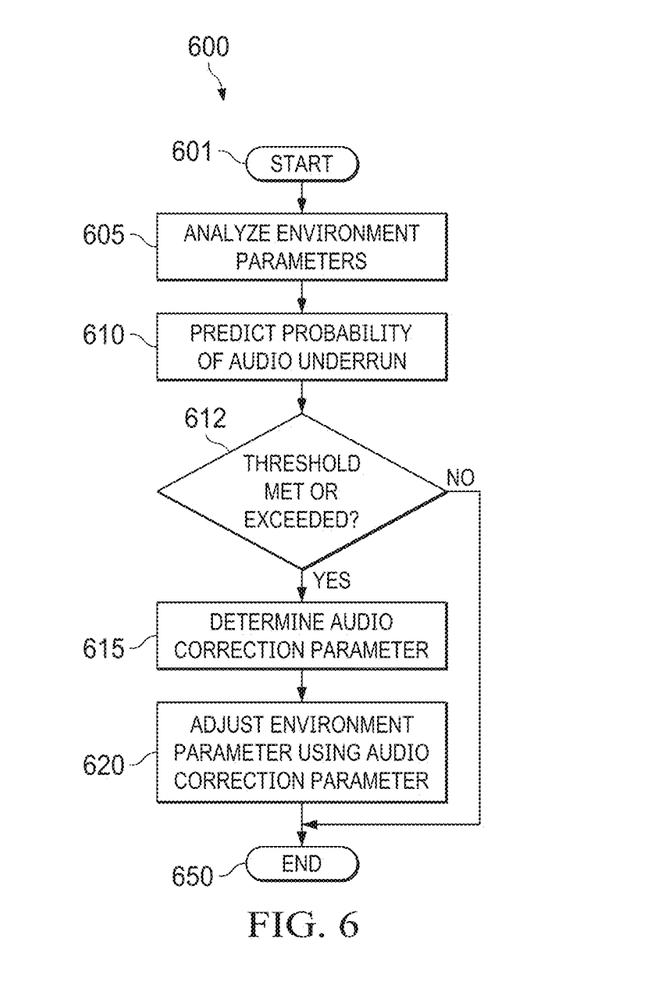
FIG. 6 is an illustration of a flow diagram of an example method to predict an audio glitch.

FIG. 6 is an illustration of a flow diagram of an example method 600 to predict an audio glitch. Method 600 starts at a step 601 and proceeds to a step 605. In a step 605, the environment parameters that have been collected can be analyzed. The environment parameters, e.g., operating state information, can be a collection of process and threads executing on the system, the available resources on the system, the applications running on the system, the size and type of audio portion that is to be played, previous audio underrun conditions occurring on the system, and other factors that can affect the processing of the audio portion, such as the operating state of one or more system components. As the learning neural network improves, additional environment parameters can be added to the collection of environment parameters gathered and analyzed.

In a step 610, the probability of an audio underrun condition or other audio glitch can be predicted using a neural network or learning algorithm. The probability of an audio underrun condition can be generated by inputting the collected environment parameters into a neural network process. The environment parameters can also be adjusted using activation and cost/loss functions. The neural network can process the input environment parameters and determine a probability of an audio underrun condition. The probability analysis can be associated with the first DNN described previously.

In a decision step 612, the probability value can be compared to a threshold parameter to determine if the probability meets or exceeds the threshold. In some aspects, the comparison can be replaced by a Boolean evaluation. This can convert the probability value to a Boolean value. If the resultant from decision step 612 is 'Yes', then the method 600 proceeds to a step 615. If the resultant from decision step 612 is 'No', then the method 600 proceeds to a step 650.

In the step 615, audio correction parameters can be determined. The audio correction parameters can specify an adjustment to one or more environment parameters derived from operating state information of one or more system components. For example, the processing system frequency, the memory frequency, and the audio buffer size can be adjusted, i.e., increased in size.

In a step 620, the processing system can be adjusted using audio correction parameters to attempt to prevent the predicted audio glitch. The audio correction parameters can include one or more adjustments to one or more environment parameters. For example, the CPU frequency can be increased and the memory frequency can be increased. Depending on the environment parameters and the audio portion characteristics, the type and intensity, i.e., amount, of the audio correction parameters can be determined using a process similar to the described second DNN process. The second DNN process can estimate what change and how much each change needs to be, i.e., the audio correction parameters, to prevent the audio underrun condition. The method 600 ends at the step 650.

Figure 7:
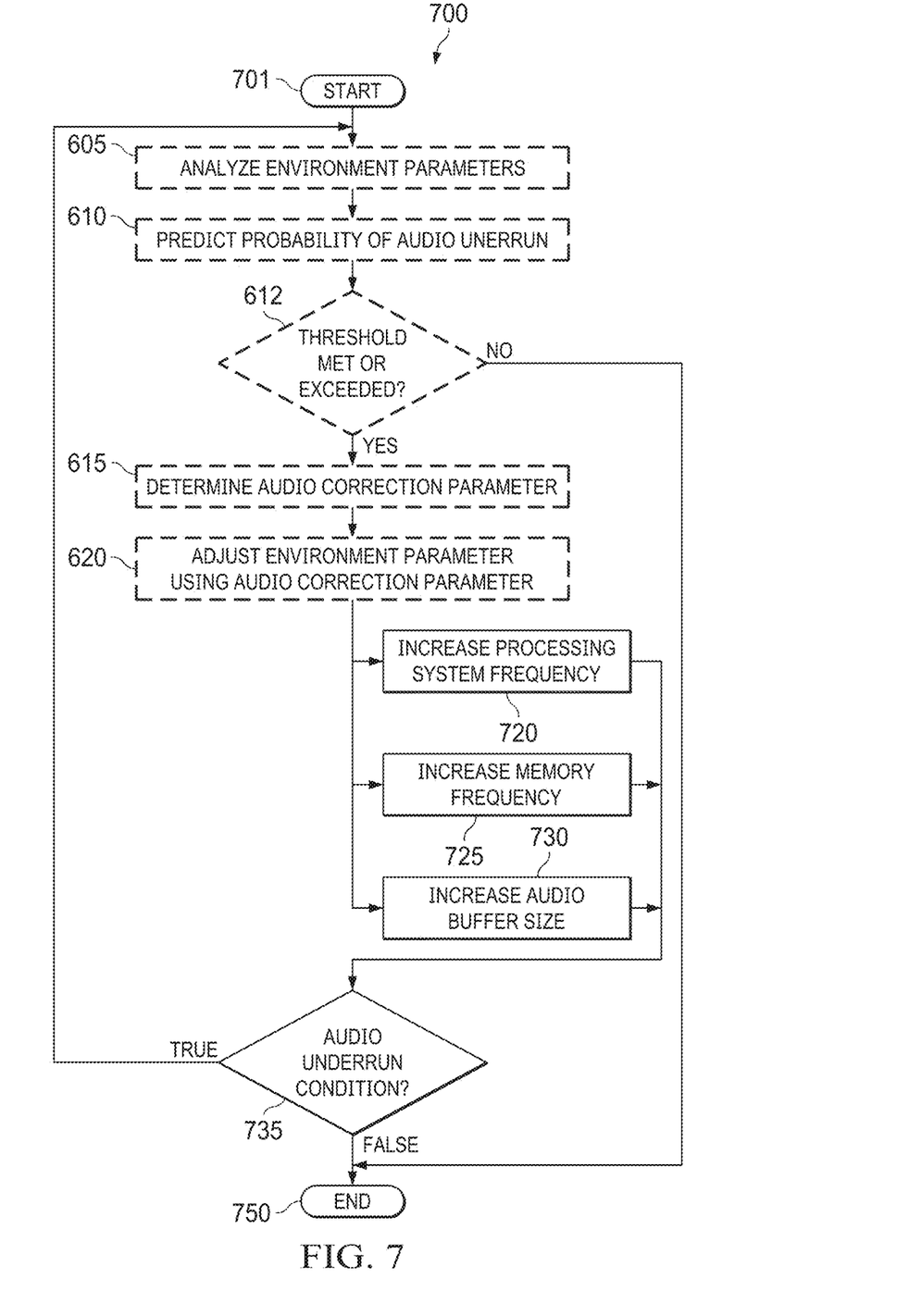
FIG. 7 is an illustration of a flow diagram of an example method, building on FIG. 6, to generate audio correction parameters.

FIG. 7 is an illustration of a flow diagram of an example method 700, building on FIG. 6, to generate audio correction parameters for dynamically preventing audio underrun. Method 700 starts at a step 701 and proceeds through the previous described steps 605, 610, 612, 615 and 620. Step 620 is further described by the steps 720, 725, and 730. In the step 720, the processing system frequency is increased, i.e., boosted. For example, the increase to operating frequency can be applied to a part or all of the processing system where the processing system can include a CPU, a GPU, an audio system processor unit, other processing units, a bus or other communication channels, communication ports, and other aspects of the processing system. In the step 725, the memory frequency is increased. In the step 730, the audio buffer size is increased. Additional processing system adjustments can be made in addition to those listed here.

Proceeding from steps 720, 725, and 730, depending on the systems that were selected for adjustment by the audio correction parameters, the method 700 proceeds to a decision step 735. In the decision step 735, the audio underrun condition is evaluated again. If the processing system detects that the audio underrun condition remains, then the method 700 loops back to step 605 for further analysis of the environment parameters and further adjustments can be made via revised audio correction parameters. If the decision step 735 does not detect a continuing audio underrun condition, then the method ends at a step 750.

Figure 8:
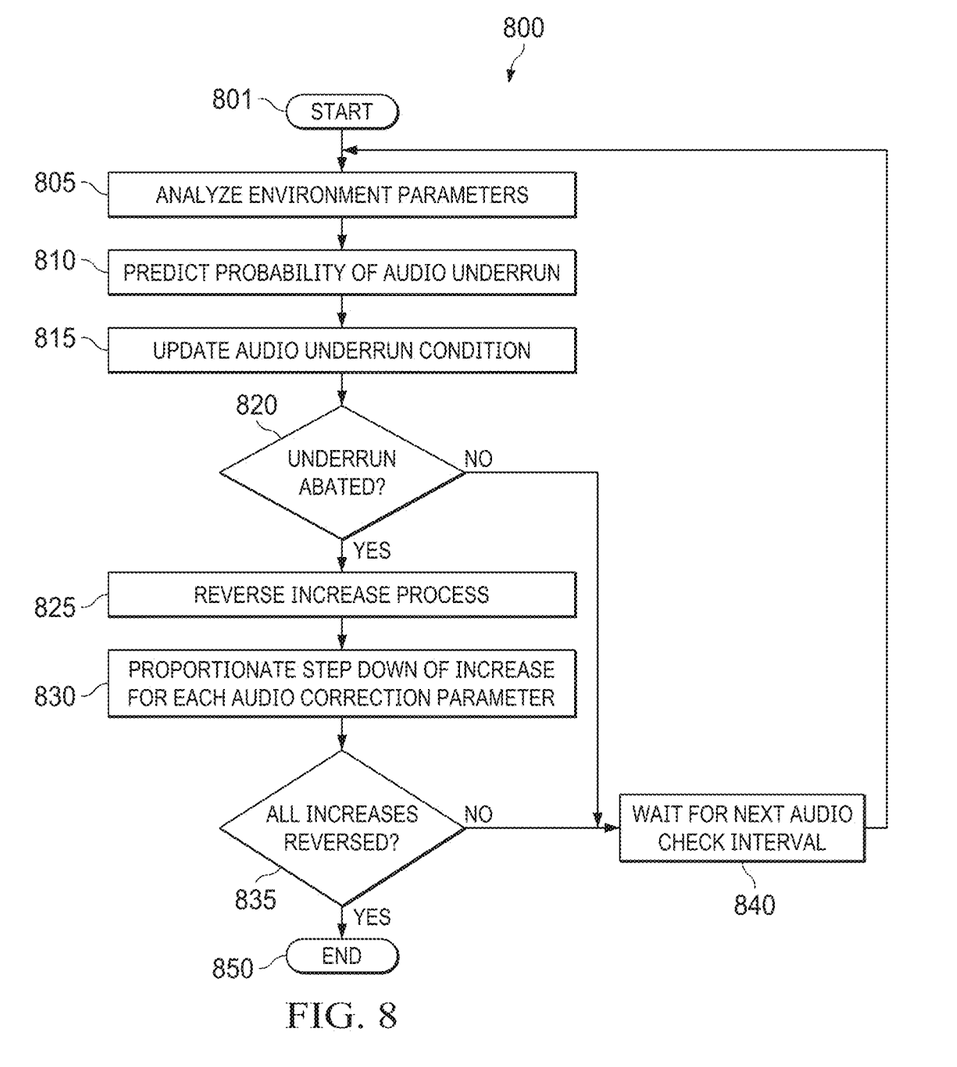
FIG. 8 is an illustration of a flow diagram of an example method to return an audio system to a normal system state.

FIG. 8 is an illustration of a flow diagram of an example method 800 to return an audio system to a normal system state. An audio system can return to a normal state, i.e., a state at which it existed prior to the implementation of the audio correction parameters, when the audio and processing systems can process audio portions in the previous processing state without an audio underrun condition occurring. The method 800 starts at a step 801 and proceeds to a step 805. In the step 805, the environment parameters can be analyzed. In a step 810, a probability of an audio underrun condition can be predicted. Steps 805 and 810 are similar to steps 605 and 610 from method 600.

In a step 815, the audio underrun condition can be updated. This can indicate that the audio underrun condition has partially or fully abated, or that the condition remains at or has increased from the previous audio check interval. Proceeding to a decision step 820, if the audio underrun condition has partially or fully abated, then the method 800 proceeds to a step 825. If the audio underrun condition has not yet abated, then the method 800 proceeds to a step 840. In the step 840, the process waits for the next audio check interval before proceeding back to step 805 to check the environment parameters again.

Proceeding to the step 825, the audio correction parameters that were previously applied can be partially or fully reversed to return the audio and processing systems back to the previous state. In a step 830, the proportion of the audio correction parameters to reverse can be computed. This can utilize previous training, system parameters, hardware being utilized, software executing on the processing system, and other factors to determine the step value to use for the proportionate reversal. Proceeding to a decision step 835, the method 800 can verify if the audio correction parameters have been fully reversed. If not, then the method can proceed to a step 840 as described above. If so, then the method can proceed to a step 850 and end.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

What is claimed is:

1. A method of processing computer generated audio, comprising:
   determining, using a neural network, a probability of an audio artifact during output of an audio signal generated using a computing system, wherein the determining the probability of the audio artifact is based at least on a processing frequency of a processor or processing unit of the system; and
   adjusting at least one of the processing frequency or a memory frequency of the system to lower the probability of an audio artifact occurring when the probability is above a threshold.

2. The method of claim 1, wherein the system is a part of a mobile device, and the audio signal is a streamed audio signal.

3. The method of claim 1, wherein the audio signal includes at least one synthetically generated spoken phrase.

4. The method of claim 1, wherein the adjusting includes increasing the processing frequency until the processing frequency reaches a maximum processing frequency value.

5. The method of claim 1, wherein the adjusting includes increasing the memory frequency until the memory frequency reaches a maximum memory frequency value.

6. The method of claim 1, further comprising reversing a prior adjustment of the system when the probability of an audio artifact occurring is not higher than the threshold.

7. The method of claim 1, wherein the neural network is a deep neural network.

8. The method of claim 1, wherein the adjusting includes increasing the processing frequency and the method further includes adjusting a size of an audio buffer of the system in response to increasing the processing frequency.

9. A method of processing computer generated audio, comprising:
   determining, using a neural network, a probability of an audio artifact during output of an audio signal generated using a computing system, wherein the determining the probability of the audio artifact is based at least on a memory frequency of the system; and
   adjusting at least one of the memory frequency of the system or a processing frequency of the system to lower the probability of an audio artifact occurring when the probability is above a threshold.

10. The method of claim 9, wherein the system is a part of a mobile device, and the audio signal is a streamed audio signal.

11. The method of claim 9, wherein the audio signal includes at least one synthetically generated spoken phrase.

12. The method of claim 9, wherein the adjusting includes increasing the processing frequency until the processing frequency reaches a maximum processing frequency value.

13. The method of claim 9, wherein the adjusting includes increasing the memory frequency until the memory frequency reaches a maximum memory frequency value.

14. The method of claim 9, further comprising reversing a prior adjustment of the system when the probability of an audio artifact occurring is not higher than the threshold.

15. The method of claim 9, wherein the neural network is a deep neural network.

16. A computing system comprising:
   one or more processing units to perform operations that include:
   determining, using a neural network, a probability of an audio artifact during output of a computer generated audio signal, wherein the determining the probability of the audio artifact is based at least on a memory frequency of the computing system; and
   adjusting at least one of a processing frequency of the computing system or the memory frequency when the probability is higher than a threshold.

17. The computing system of claim 16, wherein the neural network is a deep neural network.

18. The computing system of claim 16, wherein the computing system is part of a mobile device, and the audio signal is a streamed audio signal.

19. The computing system of claim 16, wherein the computing system is a vehicle computing system.

20. The computing system of claim 16, wherein the audio signal includes one or more synthetically generated spoken phrases.

* * * * *